United States Patent
Christ et al.

(10) Patent No.: US 8,486,508 B2
(45) Date of Patent: *Jul. 16, 2013

(54) METHOD FOR PRODUCING A FRICTION-WELDED CONNECTION AND DESIGN OF THE FRICTION-WELDED CONNECTION

(75) Inventors: Eberhard Christ, Tambach-Dietharz (DE); Jorg Thiem, Zella-Mehlis (DE); Torsten Fuchs, Tambach-Dietharz (DE); Gerhard Dubiel, Ruhla (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 560 days.

This patent is subject to a terminal disclaimer.

(21) Appl. No.: 12/596,586

(22) PCT Filed: Sep. 14, 2007

(86) PCT No.: PCT/EP2007/008023
§ 371 (c)(1),
(2), (4) Date: Jan. 25, 2010

(87) PCT Pub. No.: WO2008/138388
PCT Pub. Date: Nov. 20, 2008

(65) Prior Publication Data
US 2010/0119772 A1    May 13, 2010

(30) Foreign Application Priority Data
May 10, 2007 (DE) .......... 10 2007 021 891

(51) Int. Cl.
*B32B 3/24* (2006.01)
*B29C 65/06* (2006.01)
*B23K 20/12* (2006.01)

(52) U.S. Cl.
USPC ...... 428/139; 411/171; 228/112.1; 228/114.5

(58) Field of Classification Search
USPC .............. 428/139; 228/114.5, 112.1; 411/171
See application file for complete search history.

(56) References Cited

U.S. PATENT DOCUMENTS

| 3,477,115 A | 11/1969 | Martin et al. |
| 3,495,321 A | 2/1970 | Shaff et al. |
| 4,359,813 A | 11/1982 | Mauer |
| 6,067,839 A | 5/2000 | Xie |
| 2006/0213954 A1* | 9/2006 | Ruther et al. ............ 228/113 |
| 2011/0182657 A1* | 7/2011 | Eberhard et al. ............ 403/271 |

FOREIGN PATENT DOCUMENTS

| DE | 196 20 814 A1 | 11/1997 |
| JP | 7-42721 A | 2/1995 |
| WO | WO-2007/147464 A1 | 12/2007 |

* cited by examiner

Primary Examiner — William P Watkins, III
(74) Attorney, Agent, or Firm — Birch, Stewart, Kolasch & Birch, LLP (57) ABSTRACT

The invention relates to a method for producing a friction-welded connection between a plurality of superimposed flat components held together by a connecting member, wherein a collar of said connecting member rests on an upper component and the front end of said connecting member forms a friction-welding zone with a lower component, said friction-welding zone being produced by rotation and pressure of the connecting member. After formation of the friction-welding zone, the rotation of the connecting member ceases at the end of a first step and, in a second step, upon cessation of the rotation of the connecting member prior to contact of the collar with the upper component, a pressure is exerted on the connecting member by a pressure-applying tool, said pressure pressing the collar against the upper component because of a deformation.

19 Claims, 4 Drawing Sheets

METHOD FOR PRODUCING A FRICTION-WELDED CONNECTION AND DESIGN OF THE FRICTION-WELDED CONNECTION

The invention relates to a method for producing a friction-welded connection between a plurality of superimposed flat components held together by a connecting member, wherein a collar of said connecting member rests on an upper component and the front end of said connecting member forms a friction-welding zone with a lower component, said friction-welding zone being produced by rotation and pressure of the connecting member.

The invention further relates to a friction-welded connection produced by said method between a plurality of superimposed flat components.

A friction-welded connection between a plurality of superimposed flat components held together by a connecting member, wherein a collar of said connecting member rests on an upper component and wherein said upper component is provided with a penetration for receiving the connecting member, is known from U.S. Pat. No. 3,477,115. According to the information given in the aforementioned publication, the method employed for producing said friction-welded connection consists in that a holed or unholed upper component is penetrated by a connecting member with a blunt front face to reach a lower component, wherein the application of pressure from the connecting member on the lower component results in a friction-welding zone between the connecting member and the lower component, wherein the two components are subsequently joined by the connecting member with its collar, which rests on the upper component, and the friction-welding zone. Said joining depends greatly on the production of the friction-welding zone, which is formed in particular between the front end of the connecting member and the lower component, without the two components being subject to any particular holding tension, because the pressure-application force is reduced during the friction-welding operation on account of the softening of the material to be welded, wherein the components to be joined are held precisely in the positions in which the material in the friction-welding zone will subsequently solidify. Consequently, the friction-welding method employed in the aforementioned publication is unable to result in a connection that is subject to a particular holding tension.

The object of the invention is to design the above-described friction-welding method such that, in addition to the friction-welded connection, the upper component is subject to a pressure-application tension directed towards the lower component, also when the friction-welding zone has solidified. The object of the invention is achieved in that, after formation of the friction-welding zone, in a first step, at the end of which the rotation of the connecting member ceases, and in a second step upon cessation of the rotation of the connecting member prior to contact of the collar with the upper component, a pressure is exerted on the connecting member by a pressure-applying tool, said pressure pressing the collar against the upper component because of a deformation.

The fact that the method for producing the friction-welded connection is designed in the aforementioned two steps ensures that, first, the friction-welded connection itself is produced, such that, with the end of the friction-welding operation and with the rotation of the connecting member virtually at a stop, the collar of the connecting member is still a short distance away from the upper component, i.e. in a position before the collar contacts the upper component, with the result that, in the second step of the method according to the invention, the pressure applied to the collar (which is thereby deformed and twisted) results in the upper component being subjected to a constant pressure, said constant pressure being completely independent of the design and final state of the friction-welded connection.

The friction-welded connection produced according to the above method is so designed according to the invention that, through the application of pressure to the connecting member, the collar is provided at the end of the friction-welding operation with a deformation adapted to the upper component, said deformation effecting the secure joining between upper component and connecting member. The collar, therefore, is of a design that allows it to be deformed, said deformation then giving rise to a secure joining between the upper component and the connecting member, with the result that the upper component is constantly pressed against the lower component by the deformed collar.

The method according to the invention can be employed to join a plurality of superimposed flat components regardless of whether the upper components are each provided with a penetration for receiving the connecting member or are in the form of unholed upper components. In the first case, through rotation and pressure, the front face of the connecting member melts the material of the lower component in the region of the front face, this leading to formation of the friction-welding zone on the lower component. In the second case, the connecting member is pressed through the upper components as a result of the softening thereof and is brought into contact with the lower component to form the friction-welding zone.

In an advantageous embodiment, the collar may be of such design that it has an obtusely conical contact surface with respect to the upper component, wherein, after deformation, the outer edge of said contact surface rests in ring-like manner on the upper component or penetrates thereinto.

Alternatively, it is possible for the collar not to be formed until during the method for producing the friction-welded connection, more specifically such that the collar is in the form of a bulge formed by a pressure-applying tool, said bulge being part of a bore in the connecting member on the side thereof facing away from the upper component. This design of the collar involves a simplification of the construction thereof, because the collar need not be present from the outset on the connecting member. It is created only by the bulging-out of the wall of a bore in the connecting member and is pressed into an inner cone of the penetration in the upper component, this then likewise guaranteeing a secure joining between upper component and connecting member. In an advantageous embodiment, the friction-welding zone can be formed by a ring surface on the front face of the connecting member. In this case, as the connecting member is rotated and pressure is applied to it, the limited area of the ring surface quickly results in the formation of a friction-welding zone, with the consequence that this design is especially favourable for purposes of quick production. Alternatively, it is possible for the friction-welding zone to be formed by the full cross-sectional area of the base on the front face of the connecting member, this resulting in an especially large area of the friction-welding zone, which is therefore capable of withstanding high loading.

In order to achieve an advantageous design of the drive of the connecting member for rotation and pressure thereof, the connecting member is advantageously provided on its side facing away from the upper component with a receiving cross-section that fits into a driving chuck. Said cross-section may be, for example, a hexagon which can then be received by a corresponding hexagon of the driving chuck. Said driving cross-section may be a mandrel-like cross-section which then, therefore, fits into a driving chuck provided with a corresponding opening. Alternatively, the connecting member may be provided with a hollow driving cross-section suitable for receiving a mandrel-like driving chuck.

If the connecting member is designed with a hollow driving cross-section, said cross-section can additionally be designed with an inner cone, said inner cone then advantageously serving to receive a pressure-applying tool. Such a pressure-applying tool may advantageously form an outer cone which fits into the inner cone, this then making it possible for the inner cone to be caused to bulge correspondingly outwards and for the collar to be so deformed as to be pressed against the upper component.

The connecting member itself may be in the form of either a female part or a threaded stud, this making it possible for further components to be attached on the connecting member or to the connecting member.

The production of a pressure-application force originating from the collar may be facilitated in that the connecting member is in the form of a pipe part with a peripheral notch, wherein, when pressure is applied, said peripheral notch is compressed to such an extent that the collar is in snug contact with the upper component.

For purposes of automated production, it may be advantageous to provide the connecting member with a design which allows or simplifies the automated conveying thereof. This can be accomplished, for example, in that the connecting member is connected to the pressure-applying tool via a predetermined breaking point, wherein, at the end of the friction-welding operation, said pressure-applying tool breaks away from the predetermined breaking point as a result of application of increased pressure. Such a design is especially suitable in cases where use is made of an especially short connecting member which of itself is poorly suited for automated conveying, but which, when lengthened by the pressure-applying tool, which is connected to the connecting member by a predetermined breaking point, can easily be manipulated using known conveying apparatuses without the pressure-applying tool being in the way after the welding operation because it can then be broken off by means of the predetermined breaking point and, if necessary, discarded.

The collar of the connecting member can be provided with an annular bead facing the components, wherein, upon being pressed onto the upper component, said annular bead counteracts any lateral displacement of the connecting member while additionally providing a seal. This particularly prevents any foreign bodies, especially moisture, from penetrating into the region of the friction-welding zone. The annular bead is especially effective if it is hardened.

Illustrative embodiments of the invention are presented in the drawings, in which.

Figures 1, 2, 3, 4, 5, 6, 7, 8:
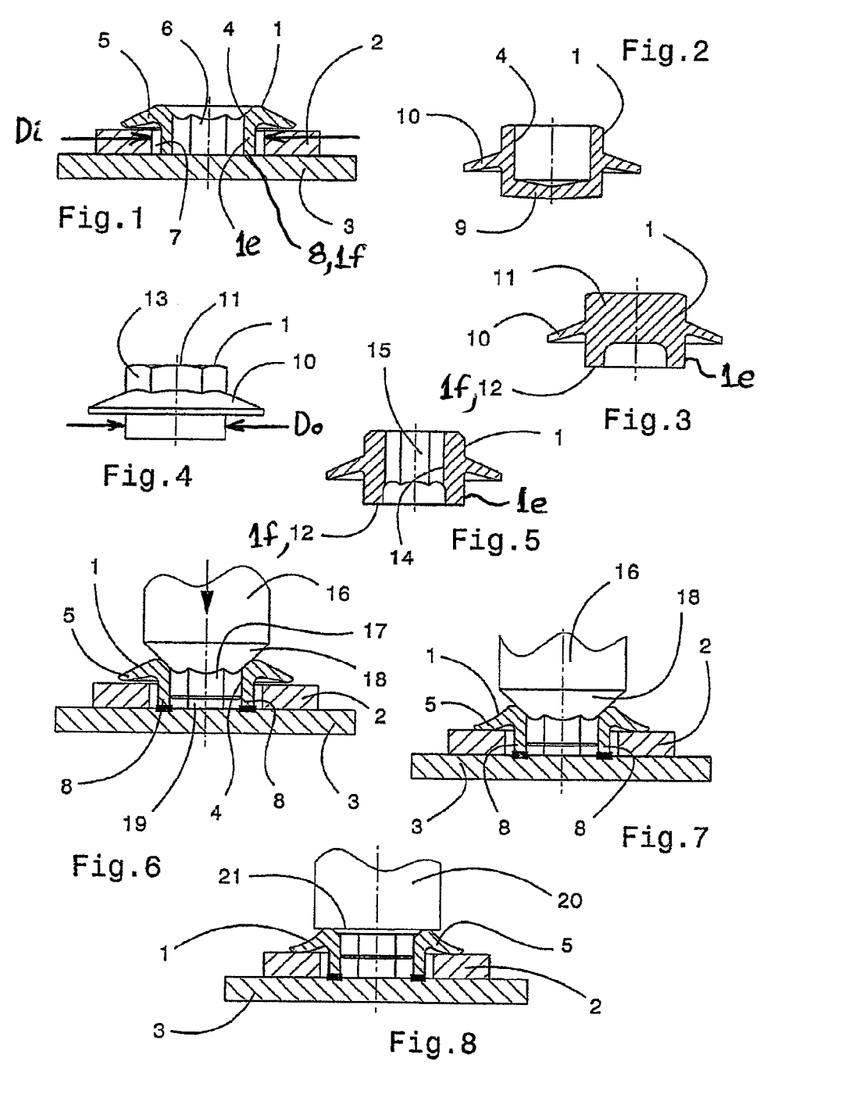
FIG. 1 shows a sectional view of the connecting member inserted into the penetration in an upper component, said connecting member having a hollow driving cross-section and an unwelded ring surface for contact with the upper component.
FIG. 2 shows a sectional view of a similar connecting member, of which the full cross-sectional area of its front face is provided for the friction-welding operation.
FIG. 3 shows a sectional view of a connecting member similar to the one presented in FIG. 1, albeit without the hollow driving cross-section.
FIG. 4 shows the connecting member from FIG. 3 in a non-sectional view.
FIG. 5 shows a connecting member similar to the one presented in FIG. 1 with a hollow driving cross-section and ring surface.
FIG. 6 shows a design similar to that in FIG. 1 with pressure-applying tool in position and with the friction-welding zone formed.
FIG. 7 shows the arrangement from FIG. 6 after application of pressure by the pressure-applying tool and after deformation of the collar.
FIG. 8 shows a variant design of the pressure-applying tool.

FIG. 1 presents the combination of the connecting member 1 with two superimposed flat components, namely the upper component 2 and the lower component 3. The connecting member 1, the details of which will be discussed in greater detail further below, includes a hollow inner part 4, a hollow shaft 1e (front end) with end face 1f at the lower end thereof, and a collar 5 extending radially outwards at the upper end of thereof. The collar 5 is in the form of a conical disk which is integrally connected to the inner part 4. The thickness of the collar 5 decreases towards the outside, with the result that, when pressure is applied to its outer edge, the collar 5 displays a certain degree of axial flexibility. The connecting member 1 is in the form of a hollow pipe part, the interior of which is provided with an internal hexagon which forms a driving cross-section into which a mandrel-like hexagon tool can be inserted in order to set the connecting member 1 in rotation, which will be discussed in greater detail further below. The connecting member 1 is inserted into the penetration 7 in the upper component 2 and rests with a ring surface 8 on the side of the lower component 3 facing the connecting member 1, where, as will be described further below, a friction-welding zone will later be formed. As can be seen in the drawings, including FIGS. 1 and 3-5, the penetration 7 through the upper component 2 has an inner diameter (Di) which is larger than an exterior diameter (Do) of the hollow shaft (front end) of the connecting member 1.

FIGS. 2 to 5 present variations of the connecting member 1. In the sectional representation in FIG. 2, the connecting member with its inner part 4 is hollow in form and is provided with the base 9, which, with its front face, is designed for forming the friction-welding zone. Extending outwardly from the inner part 4 is the collar 10, the cross-section of which is of similar design to the collar 5 in FIG. 1.

The connecting member 1 in the sectional representation in FIG. 3 consists of the essentially solid inner part 11, which, on the side for positioning on a lower component, is provided with the ring surface 12, which is provided to form the friction-welding zone. Extending outwardly from the inner part 11 is the collar 10, which is of similar design to the collar 10 in FIG. 2.

FIG. 4 presents the connecting member 1 from FIG. 3 in an overall view, from which it is apparent that the inner part 11 is in the form of an external hexagon 13 and can therefore be set in rotation by a driving tool with internal hexagon.

FIG. 5 presents a sectional view of a variation on the connecting member 1 from FIGS. 3 and 4, wherein merely the inner part 14 is of continuously hollow design in order thus to form space for an internal hexagon 15. Similarly to the design presented in FIGS. 3 and 4, the connecting member 1 in FIG. 5 is provided with a ring surface which serves to form a friction-welding zone.

FIG. 6 presents the arrangement from FIG. 1 together with a pressure-applying tool 16 which, with its hexagonal pressure-applying mandrel 17, engages the internal hexagon 19 of the connecting member 1, wherein, upon engagement by the pressure-applying tool 16, the outer cone 18 forces apart the upper edge of the connecting member 1, this pressing the collar 5 in the direction of the upper component 2. Furthermore, the ring surface 8 of the inner part 4 contacts the surface of the lower component 3 facing the inner part 4. The blackening at the point of contact indicates that, at this point, upon rotation of the pressure-applying tool 16 and application of pressure on the connecting member 1, the heat of friction results in the formation of a friction-welding zone which, upon solidification, finally produces a secure connection between the lower component 3 and the connecting member 1.

FIG. 6 shows the effect of the first step of the method according to the invention for formation of the friction-welding zone. After said friction-welding zone has been formed, the pressure-applying tool 16 stops rotating while, however, continuing to maintain its pressure against the connecting member 1.

The stopping of rotation of the pressure-applying tool 16 now introduces the second step of the method according to the invention, in which, as presented in FIG. 7, the pressure-applying tool 16 is pressed with increased pressure against the connecting member 1, the collar 5 of the connecting member 1 being bent back more extensively and thereby exerting a correspondingly high pressure on the relevant surface of the upper component 2. This produces the connection between the two components 2 and 3, namely through the intermediary of the connecting member 1, which, on the one side, is securely connected by its ring surface 8 and the there formed friction-welding zone to the lower component 3 and which, with its slightly bent-back collar 5, presses onto the upper component 2 in the direction of the lower component 3, as a consequence of which both components are securely held in their joined position by the connecting member 1.

FIG. 8 presents a variation on the design of the pressure-applying tool. The pressure-applying tool 20 in FIG. 8 is provided with an essentially flat, radially extending pressure-applying surface 21 which, similarly to the action applied to the connecting member 1 in FIG. 7, forces away the collar 5 of the pressure-applying surface 21 in a laterally outward direction, said collar 5 being pressed against the relevant surface of the upper component. Beyond that, the representation in FIG. 8 is identical to the one presented in FIG. 7, with the consequence that, for an explanation of the operating principle of the individual parts, reference can be made to FIG. 7.

Figures 9, 10, 11, 12, 13, 14:
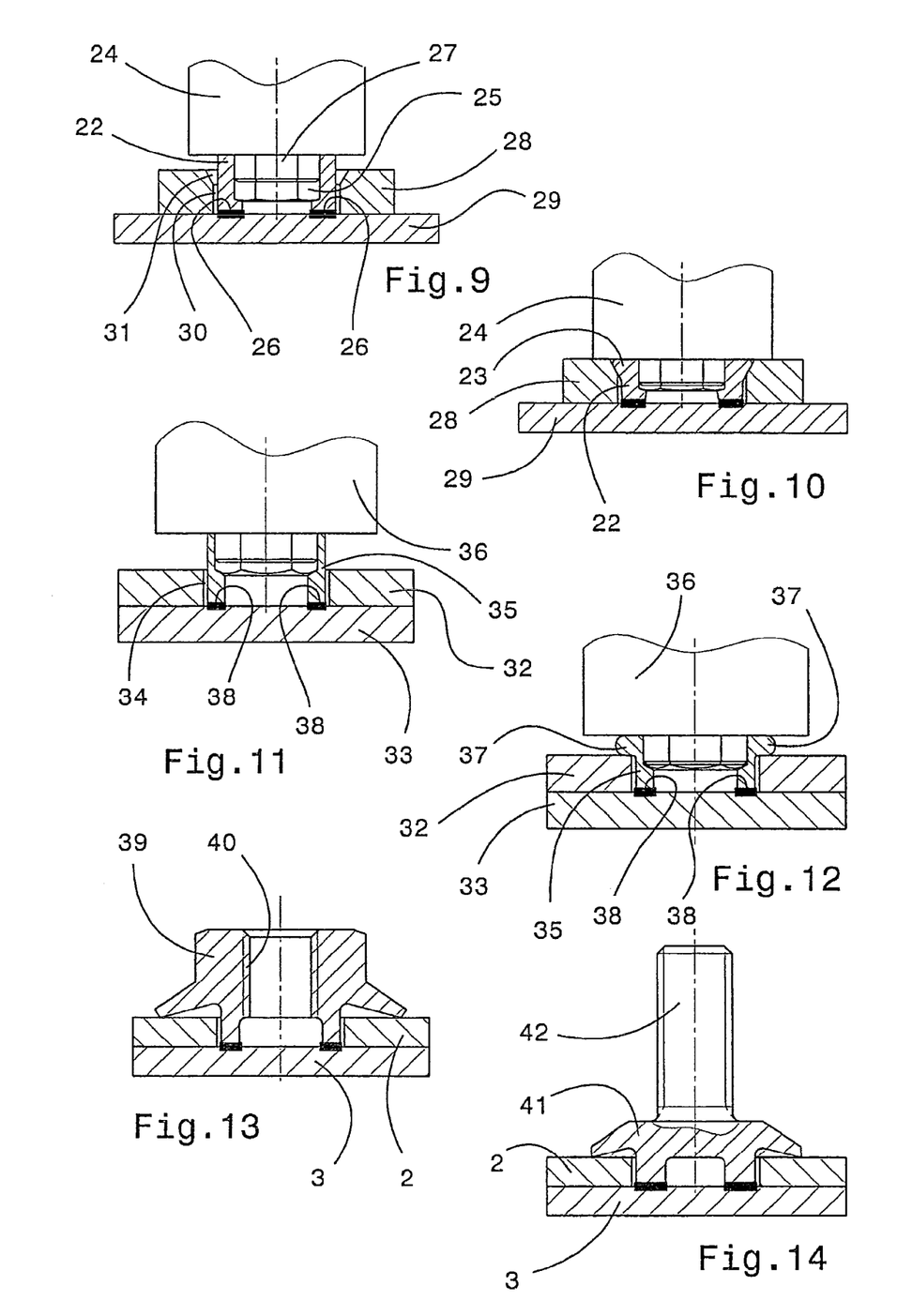
FIG. 9 shows a connecting member, inserted into an upper component, in a design which allows the compression and pressing-out of a collar.
FIG. 10 shows the design from FIG. 9 after application of pressure by the pressure-applying tool and after radially outwardly directed formation of a conical collar which is then pressed into an inner cone in the upper component.
FIG. 11 show a design similar to that in FIG. 9, wherein, when the connecting and 12 member is compressed as shown in FIG. 12, said design results in an outer annular bead on the connecting member to form the collar.
FIG. 13 shows a connecting member in the form of a female part.
FIG. 14 shows a connecting member in the form of a threaded stud.

FIGS. 9 and 10 present the design of the connecting member 22 with formation of the collar 23 by the pressure-applying operation by means of the pressure-applying tool 24. FIG. 9 presents the connecting member 22 as an essentially cylindrical component with an internal hexagon 25 and the ring surface 26, which, in this case, is blackened to indicate the friction-welding zone. The internal hexagon 25 is engaged by the hexagonal mandrel 27 of the pressure-applying tool 24. The upper component 28, the penetration 30 of which receives the connecting member 22, is provided with the inner cone 31, which is disposed on the side of the upper component 28 facing the pressure-applying tool 24. Said inner cone 31 provides a space for receiving the material that is displaced when the connecting member 22 is engaged by the pressure-applying tool 24, wherein, from the wall of the connecting member 22 in a radially outward direction, said material forms a conically shaped collar 23, as presented in FIG. 10.

FIG. 10 presents the arrangement from FIG. 9 after the end of the first step with the rotation of the pressure-applying tool 24 having stopped, wherein, as a result of the second step of the method according to the invention, the axial pressure, originating from the pressure-applying tool 24, has now compressed the wall of the connecting member 22 to such an extent that material from the connecting member 22 penetrates in a conically outward direction into the inner cone 31 and thereby forms the collar 23, which then permanently presses the upper component 28 against the lower component 29.

FIGS. 11 and 12 present a variation on the manner in which the collar is formed from the connecting member by means of the pressure-applying tool. In FIGS. 11 and 12, the two components (upper component 32 and lower component 33) lie one on top of the other, the upper component 32 being provided with the penetration 34. Inserted into the penetration 34 is the connecting member 35, which is provided with an internal hexagon similar to the one presented in FIG. 9 and which is driven by the pressure-applying tool 36 via a corresponding external hexagon. With regard to the drive, reference may be made in this connection to the explanatory remarks in relation to FIGS. 8 and 9. In FIG. 12, the pressure applied by the driving tool 36 has so greatly compressed the connecting member 35 on its side facing the pressure-applying tool 36 that an annular bead 37 has been pressed out of the connecting member 35, said annular bead 37 playing the role of the collar and thus pressing the upper component 32 against the lower component 33. The lower component 33 is connected via the ring surface 38 to the lower component 33 by means of the friction-welding zone (indicated by blackening), wherein the pressure applied by the bead 37 against the relevant surface of the upper component 32 ensures that the two components 32 and 33 remain securely connected together.

The connecting member presented in the above drawings can also be used either as a female part or as a threaded stud.

In FIG. 13, the connecting member 39 is provided with a continuous threaded bore 40, with the result that the connecting member 39, which joins the two components 2 and 3, can also be used to receive a threaded stud with its thread 40 in order to secure any additional object 5.

FIG. 14 presents the connecting member 41 in the form of a threaded stud 42 which is securely connected to the basic structure of the connecting member 41. The connection of the connecting members 39 and 41 to the upper component 2 and the lower component 3, respectively, is here accomplished in the manner explained in connection, for example, with FIG. 6.

Figures 15, 16, 17, 18, 19, 20:
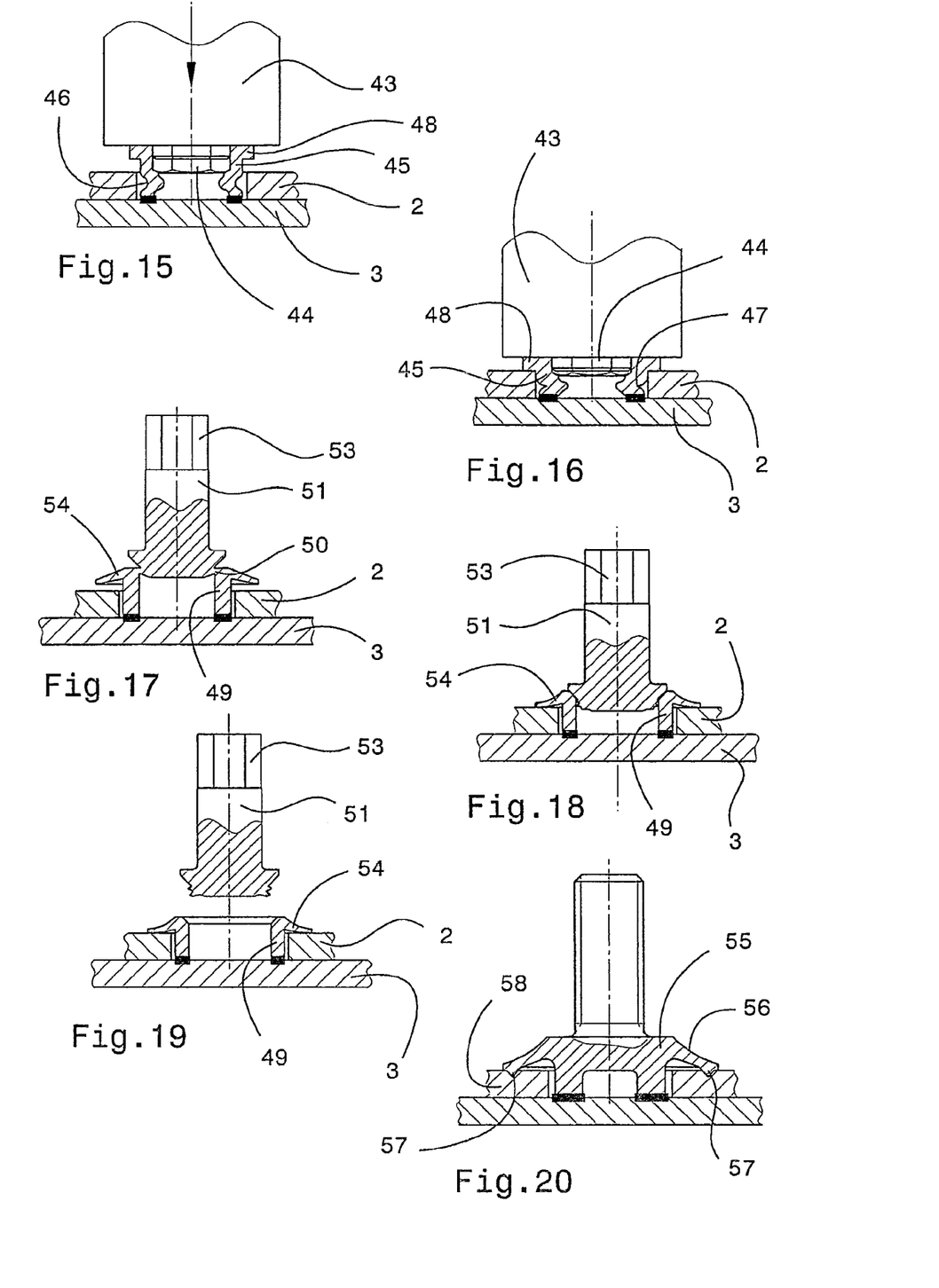
FIG. 15 shows a connecting member with a notch which allows the compression of the connecting member.
FIG. 16 shows the compressed connecting member.
FIG. 17 shows a connecting member which is connected to the pressure-applying tool via a predetermined breaking point.
FIG. 18 shows the pressed-on connecting member with broken-off predetermined breaking point.
FIG. 19 shows the pressed-on connecting member with the pressure-applying tool removed from it.
FIG. 20 shows a connecting member in the form of a stud with annular bead on its collar.

The designs presented in FIGS. 13 and 14 can be employed for a variety of applications, such as for the formation of a ground contact. Further possible deformations of the connecting member are presented in FIGS. 15 and 16. In FIG. 15, the connecting member 45 is pressed against the lower component 3 by the pressure-applying tool 43 with the hexagonal mandrel 44. The notch 46, which extends peripherally around the connecting member 45, allows the deformation of the connecting member 45, wherein, at the end of the pressure-applying operation, the deformed connecting member 45 has the shape presented in FIG. 16, wherein the notch 46 visible in FIG. 15 has been deformed into a narrow peripheral crease 47, the collar 48 on the connecting member 45 being in snug contact with the upper component 2, as a consequence of which the two components 2 and 3 are securely joined by the connecting member 45.

Further special designs of the connecting member are presented in FIGS. 17 to 19, in which the object is to provide the connecting member with a more extensive form through connection to the pressure-applying tool, said form being especially suitable for an automated feeding system in which especially small connecting members are difficult to transport and be correctly used at the point of use. Said extension of the form of the connecting member consists in that the actual connecting member, which is identical to the connecting member presented in FIG. 1, is in the first instance securely connected to the pressure-applying tool.

In FIG. 17, the connecting member 49 is integrally connected via the predetermined breaking point 50 to the pressure-applying tool 51, which, on its side facing the connecting member 49, is provided with a conical section 52 which is effective only during the friction-welding operation, as was described in connection with FIGS. 6 and 7. The pressure-applying tool 51 is in the form of a mandrel which, at its rear end, forms a hexagonal section 53 for engagement in a driving tool. When pressure is applied to the connecting member 49 and during the ensuing friction-welding operation (as was described with reference to the preceding drawings), the predetermined breaking point 50 is finally broken off as a result of increased pressure from the pressure-applying tool 51, with the consequence that the conical section 52 of the pressure-applying tool 51 is able partially to penetrate into the interior of the connecting member 49 and correspondingly deform the collar 54 of the connecting member 49 (see FIG. 18), this ultimately providing the connecting member 49, after connection to the lower component 3 by means of the friction-welding operation, with a form corresponding to the representation in FIG. 7. After the friction-welding operation has taken place, the pressure-applying tool 51 can then be removed from the connecting member 49 (see FIG. 19), so that the pressure-applying tool 51 is no longer in the way of the connection established by the connecting member 49 between the components 2 and 3.

FIG. 20 presents a friction-welded connection which is broadly identical to the one presented in FIG. 14, with the consequence that reference can be made to FIG. 14. The connecting member 55 is provided at the outer edge of the collar 56 with the annular bead 57, which has been pressed essentially over its height into the material of the upper component 58. Said connection between the annular bead 57 and the upper component 58 results in a special sealing of the collar 56 with respect to the upper component 58 and also in a securing of the connecting member 55 against lateral displacement forces.

Figures 21, 22, 23, 24, 25, 26, 27, 28:
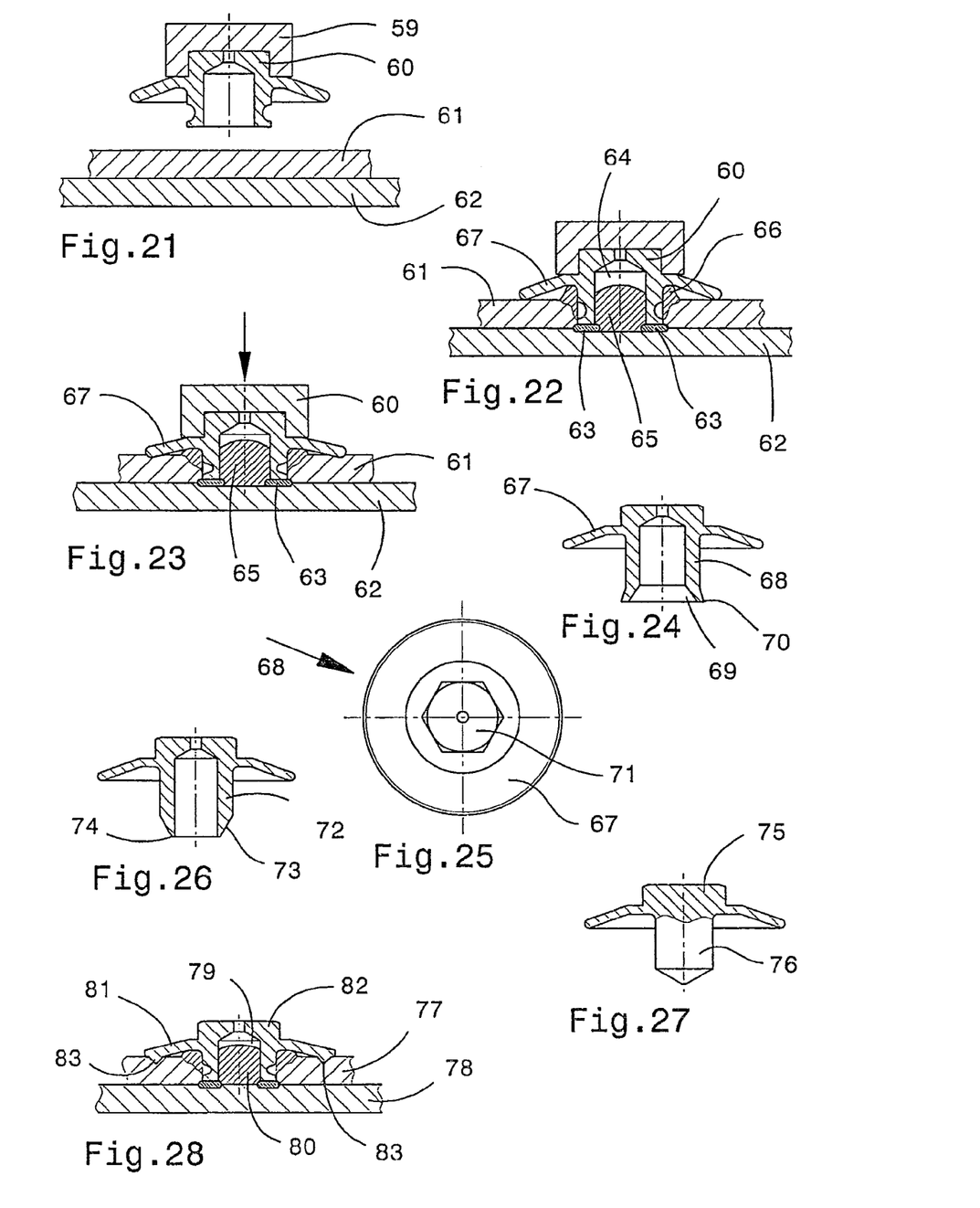
FIG. 21 shows a connecting member with driving tool in position for positioning on an unholed upper component.
FIG. 22 shows the connecting member, having rubbed its way through the upper component, wherein material from the upper component has been received into an inner bore.
FIG. 23 shows the same arrangement as in FIG. 22, after special pressure-application of the connecting member.
FIG. 24 shows a hollow connecting member with a radially outer annular cutting edge on its side facing the components.
FIG. 25 shows a top plan view of the connecting member from FIG. 24.
FIG. 26 shows a variation on the design of the connecting member from FIG. 24 with a radially inner annular cutting edge.
FIG. 27 shows a connecting member with solid inner part and obtusely conical front face.
FIG. 28 shows a friction-welded connection similar to the one in FIG. 23 with an annular bead on the collar.

FIG. 21 shows a connecting member 60 which has been engaged by a rotating and pressure-applying tool 59 and which is to be positioned on the upper unholed component 61. FIG. 22 additionally presents the connecting member 60 which has been connected to the two components 61 and 62, wherein the friction-welding zone 63 has been formed between the connecting member 60 and the lower component 62. The material 65 that was displaced during plasticization of the upper component 61 has penetrated into the interior 64 of the connecting member 60, it further being the case that, during the process of penetration into the upper component 61, plasticized material 66 has also been deposited under the collar 67.

FIG. 23 presents the arrangement from FIG. 22 after the connecting member 60 has been subsequently pressed against the two components 61 and 62, wherein the collar 67 has been bent back slightly and is thus able to exert its spring force by pressing into the upper component 61.

FIG. 24 presents a hollow connecting member 68 which, although basically identical to the connecting members presented in FIGS. 1 and 5, terminates—on its front side facing the components to be joined—in a conically extending opening 69 with outwardly blunt cutting edge 70. Such a design makes it easier for the connecting member 68 to penetrate into an unholed upper component and for the displaced material to flow inwardly.

FIG. 25 presents a top plan view of the connecting member from FIG. 24, it additionally being shown that the rear side of the connecting member 68 is in the form of a hexagon 71 which can be engaged by a suitably shaped pressure-applying tool.

FIG. 26 presents a further connecting member 72 which differs from the connecting member shown in FIG. 24 in that it is provided on its front side with an outer cone 73 which in this case terminates in the inner cutting edge 74. Once again, said cutting edge makes it easier for the connecting member 72 to penetrate into an unholed upper component and for the displaced material to flow away outwardly.

FIG. 27 presents a connecting member 75, the inner part of which is in the form of a stud 76, with the consequence that the connecting member 75 is an unholed design element.

FIG. 28 shows a friction-welded connection between an originally unholed upper component 77 and a lower component 78, wherein, similarly to the representation in FIG. 22, material 80 has flowed into the hollow space 79 of the connecting member 82, said material 80 originating from the melting of the relevant portion of the upper component 77. In addition, the collar 81 of the connecting member 82 is provided with the annular bead 83, which has penetrated to the extent of its height into the material of the upper component 77. The representation is inasmuch identical to the design presented in FIG. 20.

The invention claimed is:

1. A method for producing a friction-welded connection between at least one upper flat component superimposed on a lower flat component held together by a connecting member, the connecting member having a collar on a upper end thereof, and a hollow shaft on a lower end thereof,
the method comprising:
forming a circular penetration having an inner diameter (Di) through the at least one upper flat component, the inner diameter (Di) of the circular penetration being larger than an exterior diameter (Do) of the hollow shaft of the connecting member,
guiding the hollow shaft of the connecting member into the penetration of the at least one upper flat component, so that a space is provided between an outer wall of the hollow shaft and an inner wall of the penetration,
producing a friction-welding zone with the lower flat component by rotation and pressure of the connecting member,
after formation of the friction-welding zone, ceasing the rotation of the connecting member, and
upon cessation of the rotation of the connecting member, and prior to the collar making contact with an upper-most one of the at least one upper flat component, applying pressure on the connecting member by a pressure-applying tool, said step of applying pressure on the connecting member pressing the collar against the upper component, and deforming at least one of the connecting member and the lower flat component.

2. The method according to claim 1, the step of producing the friction-welding zone on the lower flat component further comprising:
melting material in a region of a front face the upper flat component by the step of applying pressure and rotating the connecting member.

3. The friction-welded connection produced by the method according to claim 1,
at an end of the step of producing the friction-welding zone on the lower flat component, the method further comprising:
deforming the collar to create a deformation adapted to the upper-most flat component, the deformation effecting the joining between the at least one upper flat component and connecting member.

4. The friction-welded connection produced by the method according to claim 3,
wherein the collar has an obtusely conical contact surface with respect to the at least one upper flat component, and after the deforming step,
the method further comprising:
resting an outer edge of said contact surface in ring-like manner on the upper-most flat component, or
penetrating the outer edge of said contact surface into the upper-most flat component.

5. The friction-welded connection produced by the method according to claim 3, the method further comprising:
using a pressure-applying tool to form a bulge in the collar, the bulge being part of a bore in the connecting member on the side thereof facing away from the upper-most flat component.

6. The friction-welded connection produced by the method according to claim 5, after the deforming step, the method further comprising:
pressing the bulge into an inner cone of the penetration in the upper-most flat component.

7. The friction-welded connection produced by the method according to claim 1,
wherein the step of producing the friction-welding zone is formed by a ring surface a front face of the hollow shaft of the connecting member.

8. The friction-welded connection produced by the method according to claim 1,
wherein a side of the connecting member facing away from the upper-most flat component is provided with a driving cross-section fitting into a driving chuck.

9. The friction-welded connection produced by the method according to claim 1,
wherein a side of the connecting member facing away from the upper-most flat component is provided with an inner cone for receiving a pressure-applying tool.

10. The friction-welded connection produced by the method according to claim 1,
wherein the connecting member is in a form of a female part.

11. The friction-welded connection produced by the method according to claim 1,
wherein the connecting member is in a form of a threaded stud.

12. A method for producing a friction-welded connection between an unholed, upper flat component superimposed on a lower flat component held together by a connecting member, the connecting member having a collar on an upper end thereof and a front end on a lower end thereof, and
the method comprising:
rotating and applying pressure to the collar to enable the front end of the collar to penetrate through the upper flat component, and
producing a friction-welding zone between the front end of the connecting member and the lower flat component,
the step of producing the friction-welding zone further comprising:
plasticizing material of the upper component which is displaced during penetration of the upper flat component, and
forcing the plasticized material into an interior hollow part of the connecting member, and in a space outside the front end and under the collar of the connecting member,
wherein the collar has an obtusely conical contact surface with respect to the upper flat component.

13. The method for producing a friction-welded connection according to claim 12,
wherein the connecting member is in a form of a pipe part with a peripheral notch, the step of applying pressure to the connecting member further comprising:
compressing the peripheral notch to such an extent that the collar is in snug contact with the upper-most component.

14. The friction-welded connection produced by the method according to claim 1,
wherein the connecting member is connected to a pressure-applying tool via a predetermined breaking point,
at the end of the step of producing the friction-welding zone the method further comprising:
breaking-away the pressure-applying tool from the predetermined breaking point as a result of applying an increased pressure.

15. The method for producing a friction-welded connection according to claim 12, wherein the collar of the connecting member is provided with an annular bead.

16. The friction-welded connection produced by the method according to claim 15, wherein the annular bead of the connecting member is hardened.

17. The friction-welded connection produced by the method according to claim 2,
   wherein the step of producing the friction-welding zone is formed by a ring surface on a front face of the hollow shaft of the connecting member.

18. A method for producing the friction-welding zone between an unholed, upper flat component superimposed on a lower flat component held together by a connecting member, the connecting member having a collar on an upper end thereof and a front end on a lower end thereof, and
   the method comprising:
      rotating and applying pressure to the collar to enable the front end of the collar to penetrate through the upper flat component, and
      producing a friction-welding zone between the front end of the connecting member and the lower flat component,
      the step of producing the friction-welding zone further comprising:
         plasticizing material of the upper component which is displaced during penetration of the upper flat component, and
         forcing the plasticized material into an interior hollow part of the connecting member, and in a space outside the front end and under the collar of the connecting member,
      the step of producing the friction-welding zone further comprising:
         bending the collar of the connecting member back slightly so that the collar exerts a spring force by pressing onto the upper flat component.

19. The method for producing the friction-welding zone according to claim 12, wherein front end of the connecting member terminates in a conically extending opening with an outwardly blunt cutting edge, so that the step of rotating and applying pressure to the collar enable the front end of the collar to easily penetrate through the unholed upper flat component, and for the displaced material to flow inwardly into the interior hollow part of the connecting member.

* * * * *